(12) United States Patent
Seto

(10) Patent No.: US 7,953,917 B2
(45) Date of Patent: May 31, 2011

(54) COMMUNICATIONS PROTOCOL EXPANDER

(75) Inventor: Pak-Lung Seto, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 542 days.

(21) Appl. No.: 11/171,982

(22) Filed: Jun. 30, 2005

(65) Prior Publication Data

US 2007/0005862 A1    Jan. 4, 2007

(51) Int. Cl.
*G06F 13/00* (2006.01)
*G06F 3/00* (2006.01)
*G06F 13/14* (2006.01)

(52) U.S. Cl. .......... 710/300; 710/10; 710/100; 710/305; 710/316

(58) Field of Classification Search .................. 710/100, 710/9, 300–306, 10, 316; 714/33; 711/114
See application file for complete search history.

(56) References Cited

U.S. PATENT DOCUMENTS

| | | | | |
|---|---|---|---|---|
| 5,805,882 A * | 9/1998 | Cooper et al. | ...................... | 713/2 |
| 6,754,720 B1 * | 6/2004 | Packer | ............................. | 710/3 |
| 6,816,915 B1 * | 11/2004 | Packer | ............................. | 710/2 |
| 6,826,613 B1 * | 11/2004 | Wang et al. | ................... | 709/227 |
| 6,886,051 B2 * | 4/2005 | Thiesfeld | ......................... | 710/9 |
| 7,028,106 B2 * | 4/2006 | Foster et al. | ...................... | 710/2 |
| 7,155,546 B2 * | 12/2006 | Seto | .............................. | 710/100 |
| 7,738,397 B2 * | 6/2010 | Clayton | ........................ | 370/254 |
| 7,769,831 B2 * | 8/2010 | Johnson | ........................ | 709/220 |
| 2005/0066100 A1 * | 3/2005 | Elliott et al. | ................... | 710/300 |
| 2005/0080881 A1 * | 4/2005 | Voorhees et al. | .............. | 709/220 |
| 2005/0138191 A1 * | 6/2005 | Seto et al. | ...................... | 709/230 |
| 2005/0138202 A1 * | 6/2005 | Seto | ............................... | 709/238 |
| 2005/0138261 A1 * | 6/2005 | Marushak et al. | ............ | 710/316 |
| 2005/0204197 A1 * | 9/2005 | Uddenberg et al. | ............. | 714/33 |
| 2005/0223181 A1 * | 10/2005 | Jeppsen et al. | ................ | 711/162 |
| 2005/0228924 A1 * | 10/2005 | Marushak et al. | ............. | 710/300 |
| 2006/0101171 A1 * | 5/2006 | Grieff et al. | ..................... | 710/36 |
| 2006/0230125 A1 * | 10/2006 | Johnson | ......................... | 709/220 |
| 2008/0155145 A1 * | 6/2008 | Stenfort | ......................... | 710/100 |
| 2009/0006697 A1 * | 1/2009 | Doherty et al. | ............... | 710/300 |
| 2009/0187707 A1 * | 7/2009 | Benhase et al. | ............... | 711/114 |

FOREIGN PATENT DOCUMENTS

| | | | | |
|---|---|---|---|---|
| EP | 772127 A1 | * | 5/1997 | |
| EP | 1796003 A2 | * | 6/2007 | |
| JP | 05233527 A | * | 9/1993 | |
| JP | 09128305 A | * | 5/1997 | |
| JP | 2000099278 A | * | 4/2000 | |
| JP | 2005151562 A | * | 6/2005 | |

OTHER PUBLICATIONS

Information Technology—Serial Attached SCSI—1.1 (SAS-1.1), Revision 2, Nov. 20, 2003, Project T10/1601-D, American National Standard, pp. 24-73.*

Na et al., "Link analysis and design of high speed storage buses in backplane and cabling environments",Jun. 1-4, 2010, IEEE, 2010 Proceedings 60th Electronic Components and Technology Conference, pp. 1929-1934.*

(Continued)

*Primary Examiner* — Faisal M Zaman
(74) *Attorney, Agent, or Firm* — Christopher K. Gagne

(57) ABSTRACT

An expander device is configurable to identify itself as an end device and not an edge expander device. Other embodiments are also described and claimed.

20 Claims, 5 Drawing Sheets

OTHER PUBLICATIONS

Cai et al., "A test case for 3Gbps serial attached SCSI (SAS)", Nov. 8, 2005, IEEE, Proceedings of the IEEE International Test Conference, pp. 1-9.*

Du, David, "Recent Advancements and Future Challenges of Storage Systems", Nov. 2008, IEEE, Proceedings of the IEEE, vol. 96, No. 11, pp. 1875-1886.*

Robinson, G.S., "Toward the age of smarter storage", Dec. 2002, IEEE, Computer, vol. 35, No. 12, pp. 35-41.*

U.S. Patent Application entitled "An Adaptor Supporting Different Protocols", Inventors—Pak-Lung Seto and Deif Atallah, U.S. Appl. No. 10/742,029, filed Dec. 18, 2003.

"3Gb×12-port Serial Attached SCSI (SAS) Edge Expander—Preliminary", Rancho Technology, Inc., Rancho Cucamonga, CA, USA, dated Nov. 17, 2004 (1 pgs.).

"Serial ATA: High Speed Serialized AT Attachment", Revision 1.0a, Jan. 7, 2003, APT Serial ATA Workgroup Technical Editor, Klaus-Peter Deyring, Technologies, Inc., Santa Cruz, CA, USA (pp. 1-35).

"Serial Attached SCSI and Serial ATA Compatibility—White Paper", Intel Corp.® (Authorized by Intel on Behalf of the STA™, SCSI Trade Association) Copyright 2002 (pp. 1-8).

Harry Mason, "Expanders: an indispensable component of the SAS architecture-Connectivity", Computer Technology Review, Nov. 2003, Internet Articles (5 pages).

Rob Elliott, "Serial Attached SCSI", Serial Attached SCSI Architecture, HP Industry Standard Servers Server Storage Advanced Technology, Sep. 30, 2003, *hp*® invent (pp. 1-46).

Rob Elliott, "Serial Attached SCSI", Serial Attached SCSI Link Layer—Part 1, HP Industry Standard Servers Server Storage Advanced Technology, Sep. 30, 2003, *hp*® invent (pp. 1-88).

* cited by examiner

COMMUNICATIONS PROTOCOL EXPANDER

An embodiment of the invention is related to expanders that are used to enlarge a data communications interconnect in a computer system. Other embodiments are also described and claimed.

Computer systems have various components that communicate with each other through a layered architecture of hardware (usually at the lower layers) and software (at the higher layers). Examples of such computer systems include desktop, notebook, server, as well as other more specialized types. Many of these systems have nonvolatile, mass storage that uses a popular I/O interconnect protocol for its components to communicate in the system. These protocols include the Serial Attached Small Computer System Interface (SCSI) (SAS), Serial Advanced Technology Attachment (SATA), and Fibre Channel In a typical storage scenario, the computer system has a host that is running an application program or operating system and that needs frequent access to non-volatile, mass storage in the system. The host may include a processor, main or system memory, and perhaps a system interface component, such as a system chipset or I/O controller. According to SAS, an interface is defined between the host and a number of non-volatile, mass storage devices (e.g., rotating disk drives, tape drives, etc.) that can be scaled as the storage needs of the system increase. The interface has a SAS controller (also referred to as a host controller) that receives requests from the host, and makes the necessary translations and manages the connections needed to either write or read from the appropriate devices in the mass storage. For example, the host may request that a particular file be stored in non-volatile storage. The controller translates this into lower level requests that might, for example, spread the data to be written over one or more disk drives. This also allows the controller to implement availability and reliability algorithms that allow for easy recovery from a failed disk drive, or that verify and correct for any errors during a read or write. Off loading such functions from the host allows the host to focus on other tasks, thereby improving performance of the overall system.

There are several different techniques for providing increased connectivity to a storage I/O interconnect, so that additional storage devices may be added. In one such technique, the controller is fitted with multiple, protocol engines that can operate in parallel. Each protocol engine may be capable of supporting multiple storage I/O protocols, e.g. SAS, SATA, as well as perhaps Fibre Channel. The controller has a host interface on one side, and one or more storage I/O ports on the other. See U.S. patent application Ser. No. 10/742,029, filed Dec. 18, 2003, entitled "An Adapter Supporting Different Protocols". That patent application also shows another technique where a storage I/O port of a protocol engine may be attached to an adjacent, expander device. With SAS, the attachment of two devices may be over one or more point-to-point links, where each link is a bi-directional, serial communication path. A "port" of a device may be associated with one or more links over which the device communicates with an adjacent device.

Under SAS, and in particular, the specification "Information Technology—Serial Attached SCSI (SAS)", Ref. No. ISO/IEC 14776-150: 200X and ANSI INCITS. ***; 200X PHY Layer Jul. 9, 2003, Published by American National Standards Institute, a SAS adapter port or link may attach directly to an end device, or alternatively be indirectly coupled via an expander. The end device could in the latter case be attached to an external link of the expander. An end device is one that either originates or consumes payload data transferred by the interconnect. In contrast, an expander does not source or consume such data but rather transfers the data from one of its external links to another one of its external links. This may be done according to a routing function. A frame received through a particular external link is analyzed to determine its destination address, and if the destination address matches one that is associated with another link (listed in, for example, a routing table of the expander), then the frame is forwarded out of the expander through that associated link.

Under SAS, there are two types of expanders, an edge expander and a fanout expander. An edge expander has much more limited routing capability than a fanout expander, and accordingly, for the same number of links, is much less expensive to manufacture. The edge expander also performs subtractive decode routing (or simply subtractive routing). If a frame arrives into an edge expander and its destination address does not match any that are "known" by the expander, the frame is then routed to one or more predefined links of a single, subtractive decode port. In contrast, a fanout expander does not need to perform any such subtractive routing, because it has knowledge of the locations of all of the end devices within an SAS domain.

According to SAS, when two edge expanders are attached to each other, the attaching port of each expander must be configured as a subtractive decode port. In addition, each edge expander can have no more than one subtractive decode port within it. Therefore, the SAS adapter described above with an embedded, conventional edge expander onboard will exclude several open system topologies. For example, some disk enclosures, that is enclosures which contain multiple disk drive units, have a conventional, edge expander to which the disk drive units are attached as end devices. The above described SAS adapter with the conventional edge expander embedded onboard will therefore not be able to communicate in a predictable manner with more than one such disk enclosure attached to its expander ports.

BRIEF DESCRIPTION OF THE DRAWINGS

The embodiments of the invention are illustrated by way of example and not by way of limitation in the figures of the accompanying drawings in which like references indicate similar elements. It should be noted that references to "an" embodiment of the invention in this disclosure are not necessarily to the same embodiment, and they mean at least one.

DETAILED DESCRIPTION

Figure 1:
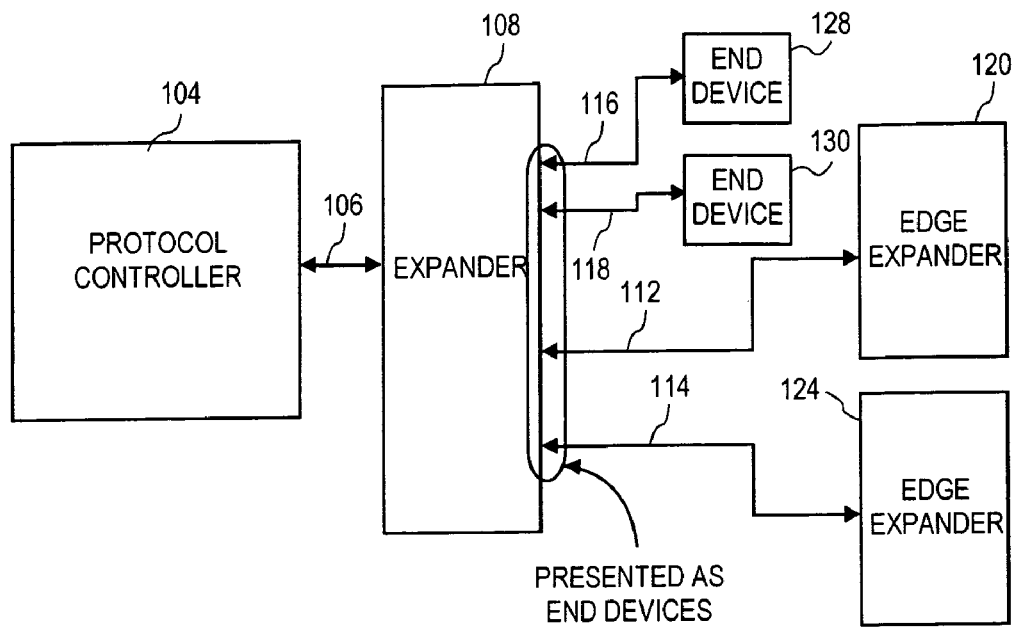
FIG. 1 is a block diagram of a communications protocol controller and expander, according to an embodiment of the invention.

FIG. 1 is a block diagram of a communications protocol controller and expander, according to an embodiment of the invention. The expander 108 is attached to the controller 104, by one or more links 106. There are further link sets 112-118 over which the expander 108 is to present itself during an identification process as an end device, and not an edge expander device. The expander 108 will thus "lie" to, for example, the two, attached edge expander devices 120, 124, making it appear from the point of view of the latter edge expanders as if there are two separate end devices attached to the link sets 112, 114.

The expander 108 is "attached" to the controller 104, in the sense that there are no intervening I/O devices (end devices or expanders). Similarly, the one or more links in each set 112-118 do not have any intervening I/O devices that are serially connected between the expander 108 and the edge expanders 120, 124 and end devices 128, 130. These are examples of serial, point-to-point links, where each link may be viewed as a bi-directional serial path for data communication. The transmission medium of a link may be a guided wave structure, such as metal traces on a circuit board or an optical wave guide, or a wireless medium.

The lower and upper layers of the communications protocol that the controller 104 uses to communicate with the expander 108 and with any target device may be according to SAS. These layers include a phy layer, a link layer, a port layer, and a transport layer (to be further described below). In that case, the controller 104 is also referred to as a SAS controller with a SAS protocol engine (not shown). In that embodiment, the identification process may be an identification sequence that is part of a link reset sequence which follows a phy reset sequence in which there is speed negotiation. The SAS embodiment will be further described below with additional examples, beginning with FIG. 2.

The expander may be embedded with the controller, and may be installed within a host bus adapter (HBA) or it may be directly installed on a system motherboard. The term "embedded" refers to the expander as being either integrated within the same integrated circuit package as the controller, and/or designed with the controller's abilities in mind by the same entity so that the controller has intimate knowledge of the capabilities and purposes of the expander. In addition to increasing connectivity, an expander may also extend the physical distance between the initiator and the target devices that will be communicating via the expander.

The expander 108 may have at least two different modes of operation. In one mode, the expander 108 operates as a conventional edge expander according to SAS, in that it will identify itself to adjacent, attached devices as an edge expander over any of multiple, external expander ports. An "external" port is one that is used to communicate with another device, while an "internal" port is used to communicate within the expander device. Each port may be associated with a separate set of phys, where each phy in the set (in this mode of operation) is associated with the same, port-layer expander address. However, each phy also has a phy identifier that may be unique within that expander device. In the conventional mode, the expander 108 identifies itself by its single port-layer address as an edge expander.

In contrast, in a different mode of operation, the expander 108 is configured so that it presents itself during an identification process as an end device, and not an edge expander device. Each of the external ports that will not be used to attach to the protocol controller (also called "fanout ports"), in that case, will have a unique, SAS port-layer address assigned to them, e.g. similar to what is conventionally done for the external ports of an end device. In addition, in that mode, those external ports (through which the expander has presented itself as being an end device) are no longer subtractive decode routing capable.

Note that as to any port which, via links 106, is attached to the protocol controller 104, the expander 108 may identify itself to the controller as either an edge expander, an end device, or a special, vendor-unique device.

The expander 108 may be configured into its special mode of operation, during a power-up configuration process. For example, the expander 108 may be programmed by basic input output system (BIOS) or boot code in the computer system of which the protocol controller and expander are a part, into this special mode of operation. See the description of an example computer system below.

Figure 2:
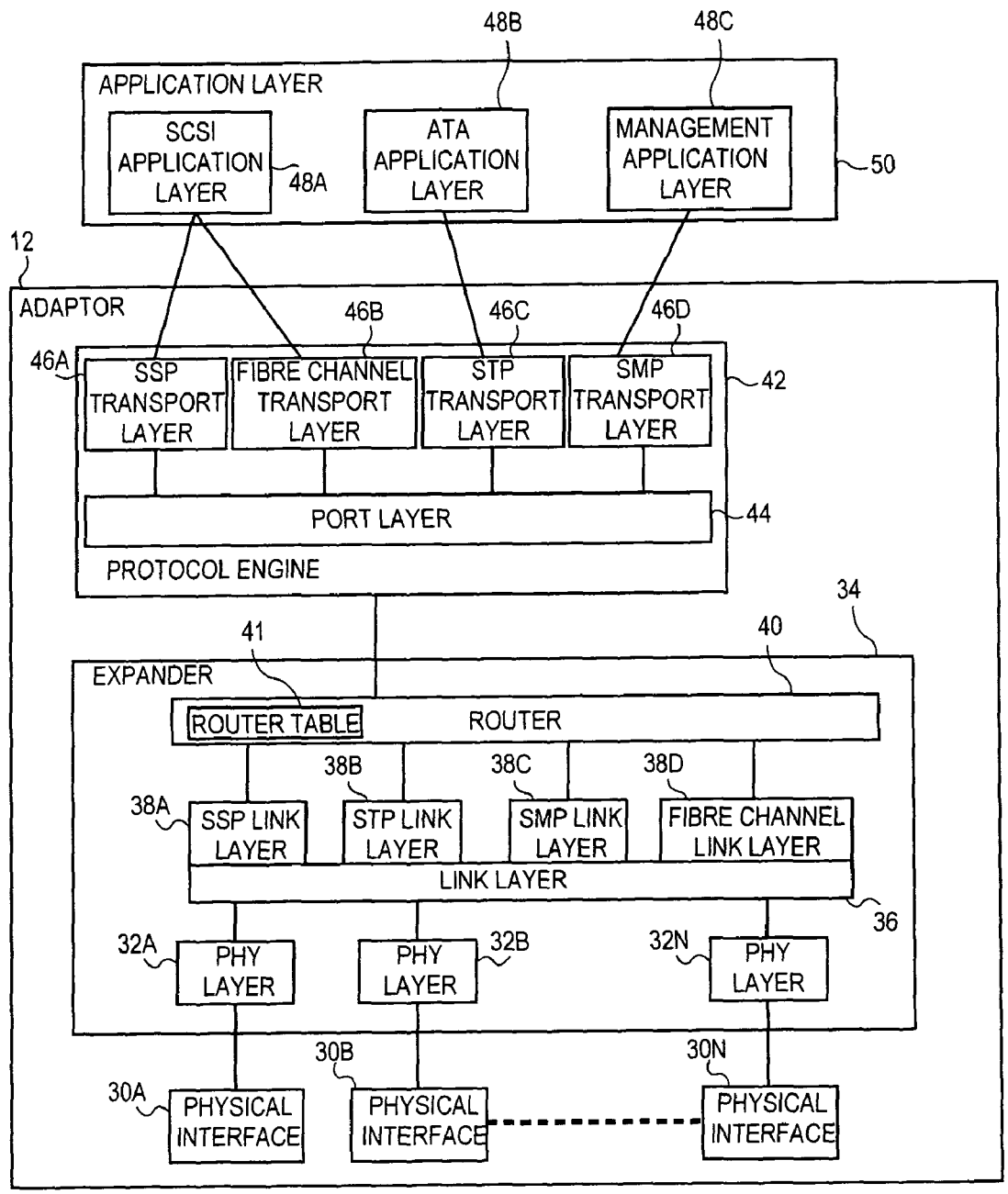
FIG. 2 is a block diagram of the different layers involved in an embodiment of the invention.

Referring now to FIG. 2, a block diagram of the different layers involved in an embodiment of the invention is shown. The layers are illustrated in the context of an adapter 12, which may be a host bus adapter, and an application layer 50. The adapter 12 includes an expander 34 in accordance with an embodiment of the invention. Starting at the lower layers and moving up, there may be one or more physical interfaces 30*a*, 30*b* . . . which may include the driver and receiver circuitry and connector hardware that are coupled to the transmission medium to form one or more links to which an adjacent device (not shown) is attached. The physical interfaces may be different, for example, one may be in accordance with SAS/SATA while another may be in accordance with Fibre Channel.

Communicating above each physical interface 30 is a phy layer 32*a*, 32*b* . . . . In this case, the phy layer 32 is physically inside the expander 34 which may be in a separate integrated circuit package. The phy layer 32 may perform encoding such as 8b10b, as well as a serial to parallel conversion. The phy performs serial to parallel conversion of data, so that parallel data is sent to the layers above the phy, and serial data is transmitted and received through the transmission medium to and from an adjacent device. Thus, for example, a 10-bit character that is serially received is collected and aligned into an 8-bit character before being sent up to the next higher layer.

Typically, the phy layer 32 decodes the characters, and then forwards the characters up to the next layer, the link layer 36. In this embodiment, the link layer 36 recognizes how a group of characters may form a frame. The link layer may also recognize frames of several different protocols. In this example, there is a serial SCSI protocol (SSP) link layer 38*a* to process SSP frames. Another element may be a serial tunneling protocol (STP) layer 38*b*. Yet another may be a serial management protocol (SMP) layer 38*c*. Finally, the embodiment of FIG. 2 also has a Fibre Channel link layer 38*d* that supports the receipt and transmission of Fibre Channel frames. A simpler, less expensive alternative is to design the expander to support only one of these I/O interconnect protocols in dedicated systems.

The expander 34 also includes a router 40 that routes a frame received over one phy layer to another phy layer, based on the destination address of the frame. Given the embedded nature of this expander 34, the same type of link and phy layers may not be needed for the attachment to the protocol engine 42. The router 40 maintains a router table 41 that provides an association between port-layer destination addresses and phy layers 32.

Although the unit of information that is being processed by the upper layers is referred to here as a "frame" this is simply used as a convenience to alternatively refer to a primitive, a packet, and an SAS frame per se, or any other unit of information used by layers above phy.

The transport layers 46*a*, 46*b*, . . . include predominantly software that initiates, maintains, and tears down a point-to-point connection between an initiator and a target device, to allow for the transmission of information between devices so that the information arrives in an uncorrupted manner and in the correct order. The transport layer is thus said to either open or dissolve a connection between devices. Examples of the transport layer protocols include those defined in SAS, SATA, and/or Fibre Channel, as well as others known in the art.

After an incoming frame has been collected by the expander 34 (e.g., received from any one or more of the physical interfaces 30), and its port-layer destination address matches an entry in the router table 41 that points to the protocol engine 42, the frame is passed to a port layer 44 which examines the frame and determines which transport layer 46 to forward the frame to. The protocol engine 42 in this example implements a number of transport layers including SSP transport layer 46a, Fibre Channel transport layer 46b, STP transport layer 48c, and SMP transport layer 46d. The port layer 44 thus interfaces between the link layers 38a, 38b . . . in the expander, and the transport layers 46a, 46b in the protocol engine, via the router 40 of the expander.

At the highest layer of the diagram in FIG. 2, an application layer 50 may include different types of application layers depending on the protocol to be used. For example, an SCSI application layer 48a provides network services to end users of SAS and Fibre Channel devices on the one hand, and communicates with the lower transport layers 46a and 46b on the other. An ATA application layer 48a similarly provides network services to end users of ATA devices on the one hand, and communicates with the lower layer, STP transport layer 48c in the adapter. In this embodiment, there is also a management application layer 48c which communicates with the lower, SMP transport layer 46d in the adapter. The application layer 50 may be entirely software that is running in the host, or running in a separate processor and embedded memory combination within the adapter 12 (not shown).

Figure 3:
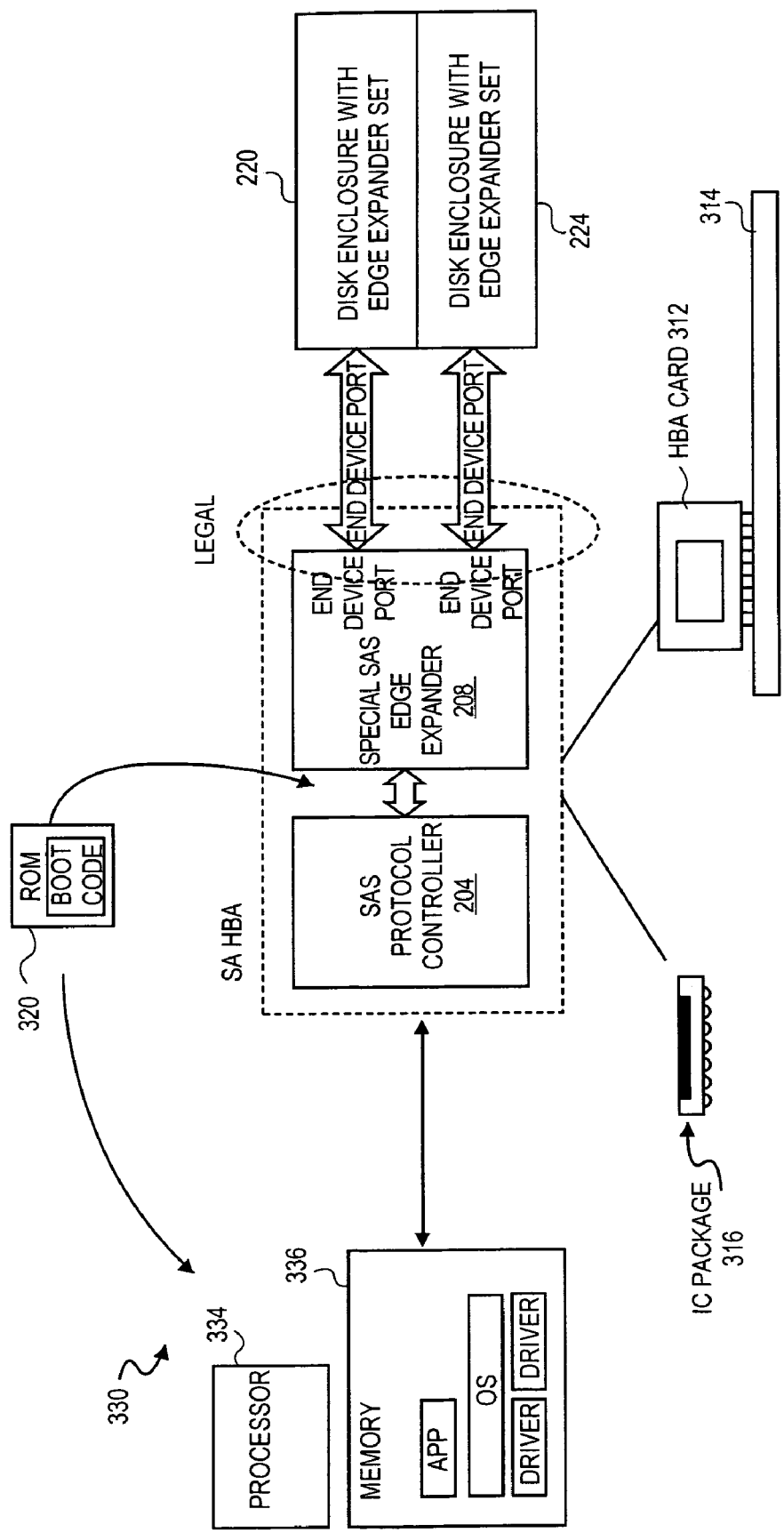
FIG. 3 shows another embodiment of the invention, including a SAS controller and a special SAS edge expander.

Turning now to FIG. 3, FIG. 3 shows another embodiment of the invention, including a special SAS edge expander. The special SAS edge expander 208 is attached via one or more ports to an SAS protocol controller 204. These two may be embedded in a host bus adapter (HBA) card 312. An alternative, however, is to install the special expander 208 with the controller 204 directly on a mother board 314 of a computer system, in a single IC package 316. From the point of view of the controller 204, it has a "SAS port" to attach to the special expander 208. The term "SAS port" refers to an external port of an end device, according to SAS. Each port is made up of one or more phys, where each phy interfaces a separate physical interface. In addition, a port includes a SAS link layer in which there may be multiple protocol link layers. Communications from the phys in a given port are processed by the transport layers for that port. There is a single transport layer for each SAS port to interface with each type of application layer that is supported by the port.

The special expander 208 in this embodiment has two fanout ports through which it has presented itself as an end device, and not an edge expander. The protocol controller 204 is also designed to accept as valid this particular situation, where there is more than one edge expander device that is coupled to the special expander 208. Note that the special expander 208 is not a fanout expander as defined under SAS, but rather may have a mode in which it is configured as a conventional edge expander.

The fanout ports of the special expander 208 in FIG. 3 attach to respective disk enclosures 220, 224. Each disk enclosure has an edge expander set, as defined under SAS, which includes an edge expander to which are attached a number of non-volatile mass storage end devices. Each disk enclosure identifies itself as an edge expander, to the special expander 208. As explained above in connection with FIG. 2, each device has a port that includes a port layer and a phy layer. The SAS controller 204 is given knowledge of the port layer destination addresses of each of the mass storage devices within the disk enclosures 220, 224, while the special expander 208 associates those destination addresses with its corresponding fanout port. Frames received from the controller 204 are then routed based on this table to the appropriate disk enclosure.

The special expander 208 may be configured into its special mode of operation by a processor executing boot code or basic input/output system (BIOS) that is stored in read only memory (ROM) 320. The ROM 320 may be physically located on the host bus adapter that includes the controller 204 and expander 208, or it may alternatively be located with the hardware that makes up the host 330. The host 330 has a processor 334 and a memory 336, where the latter typically contains the instructions that make up an application, operating system, and driver programs to be executed by the processor 334. The boot code may alternatively be executed by a processor and memory that are embedded in the host bus adapter (not shown). Other ways of configuring the special expander into its special mode of operation are possible.

Figure 4:
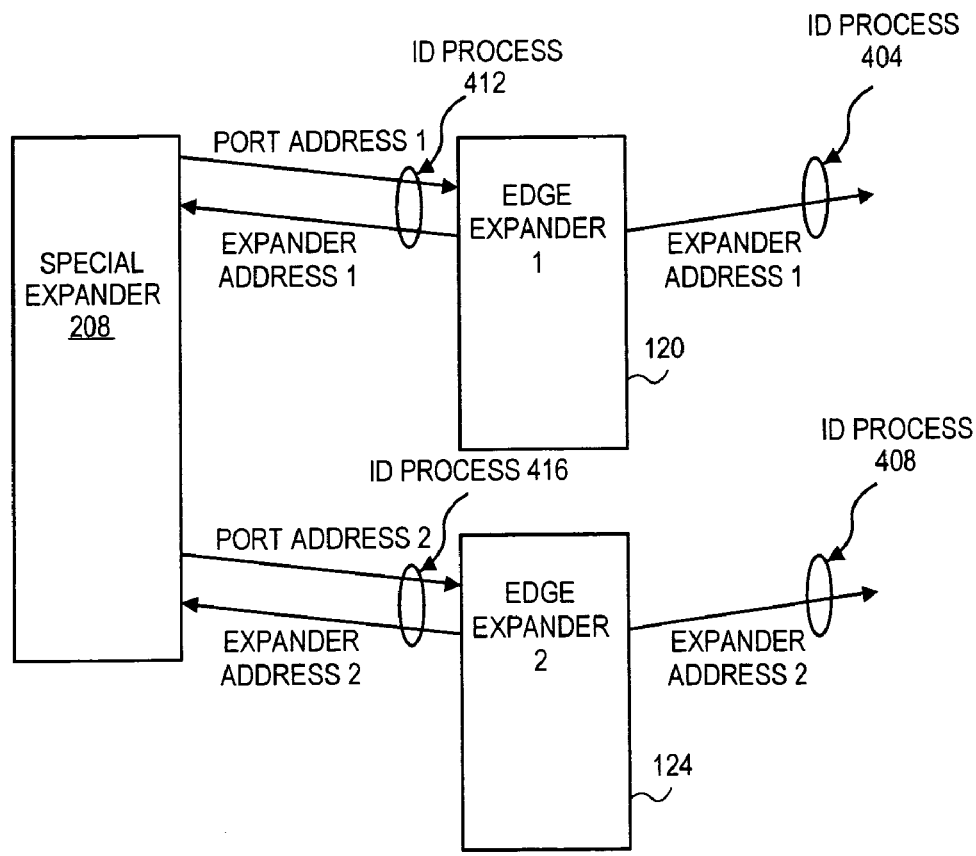
FIG. 4 is a diagram of identification processes, according to an embodiment of the invention.

Referring now to FIG. 4, a diagram of device identification processes is shown which includes at least one in accordance with an embodiment of the invention. The diagram shows information that is passed between the special expander 208 and the example, dual edge expanders 120, 124. Note that the edge expanders 120, 124 may be entirely conventional devices that perform conventional identification processes 104, 108, respectively, in which each device identifies itself through a respective, expander address that is unique to not just a SAS domain in which they reside, but also, in certain other embodiments, is globally unique.

By virtue of the special expander 208, an identification process 412 proceeds, in accordance with an embodiment of the invention, as follows. This process is performed upon the expander 208 and the edge expander 120. Here, the expander 208 identifies itself to the expander 120 as an end device, and not an edge expander device. As to the expander 120, it identifies itself to the expander 208 as an edge expander device, and not an end device. This may be achieved by the expander 208 sending an identifier frame to the expander 120 that includes its port address (port address 1).

In a different identification process 416 for the same SAS domain, the special expander 207 identifies itself as a end device, with port address 2 that is different from port address 1. In that process, the expander 124 identified itself as an edge expander, with expander address 2. Note that is the same address which the edge expander 124 uses to identify itself to other attached devices (e.g., in process 408). Similarly, expander 120 also uses the same expander address 1 to identify itself to all of its attached devices (e.g., process 404).

Figure 5:
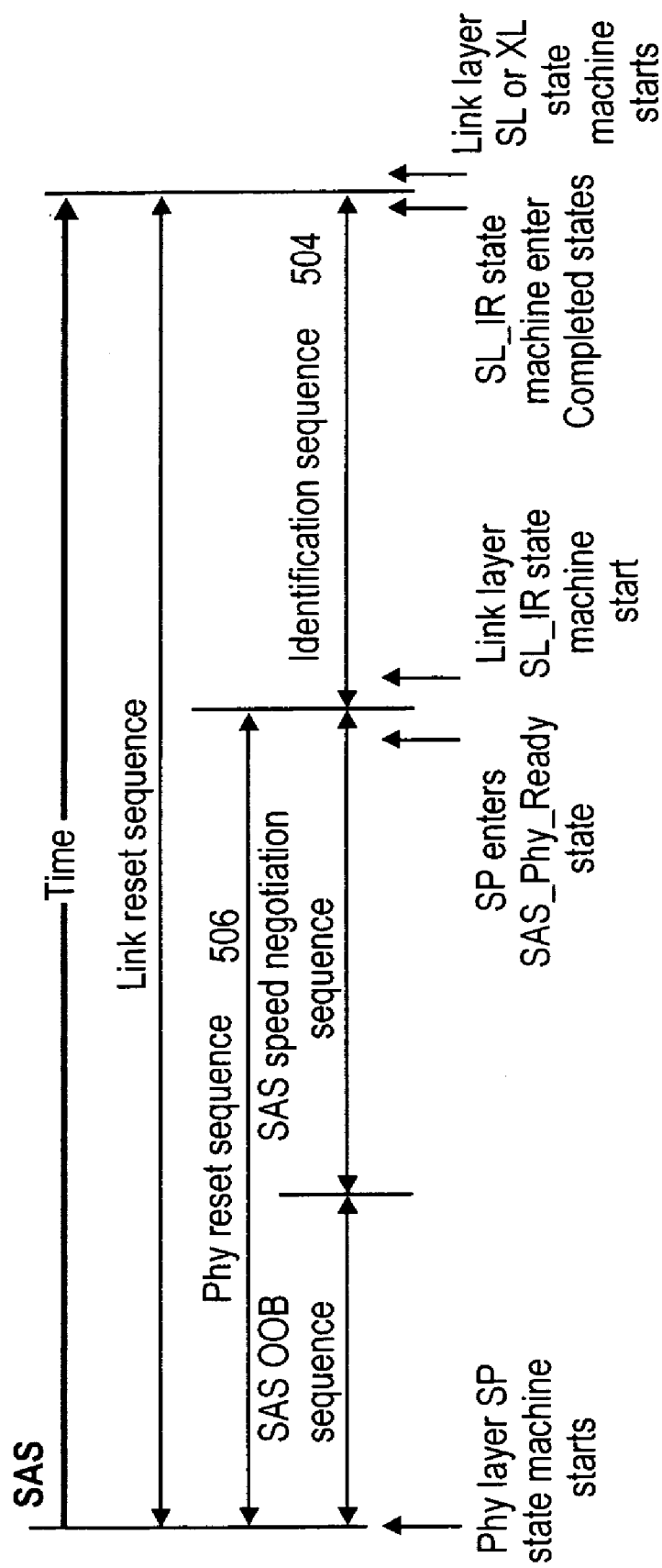
FIG. 5 shows an SAS reset sequence during which an identification process, according to an embodiment of the invention, may be performed.

The identification processes described generally above may be implemented as part of a link reset sequence, for a SAS embodiment. This is depicted in FIG. 5 for an example link reset sequence in which the identification sequence 504 follows a phy reset sequence 506. The phy reset sequence 506 includes an out of band (OOB) signaling sequence followed by a speed negotiation sequence. Next, the phy layers enter a "ready" state. Thereafter, link layer state machines start the identification sequence for a pair of attached devices. During the identification sequence, two attached devices send to each other identifier frames that include their respective addresses (see FIG. 4).

Figure 6:
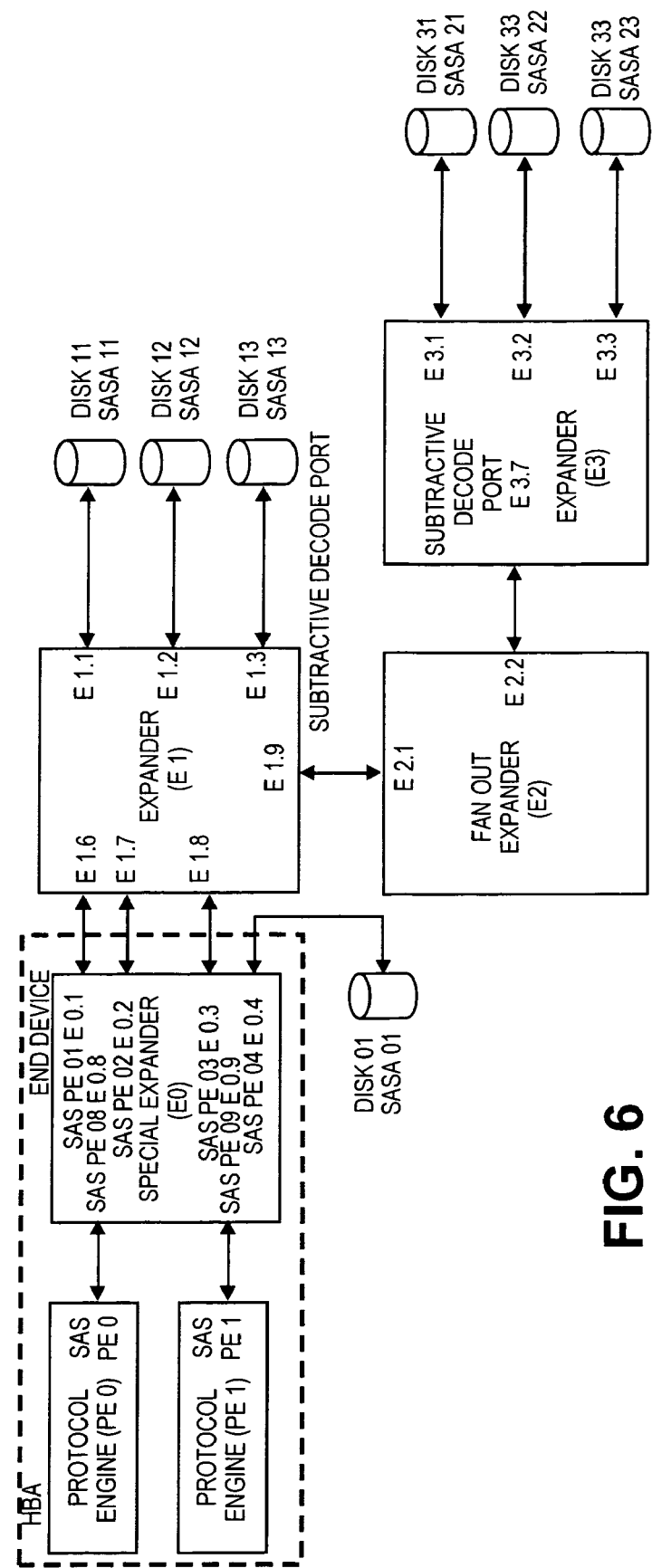
FIG. 6 is a block diagram of an SAS domain, according to an embodiment of the invention, to illustrate how connections may be made between end devices.

Turning now to FIG. 6, an example SAS domain is shown having a protocol controller that includes two separate protocol engines operating in parallel (PE0 and PE1) attached through respective links to a special expander (E0). The special expander E0 is attached to a conventional, edge expander E1 through three sets of phys E0.1, E0.2, and E0.3. In addition, the special expander E0 is attached to a mass storage end device (disk 01) through a further phy E0.4.

As to expander E1, this device is attached to a set of three mass storage end devices (disks 11, 12, and 13) through respective phys E1.1, E1.2, and E1.3. In addition, a further phy E1.9 attaches to phy E2.1 of a fanout expander (E2). As described above, a fanout expander has knowledge of the locations of all end devices in the SAS domain, that is it "knows" which port to forward an incoming frame (provided, of course, that the frame includes a valid, destination address). In contrast, expander E1 has its phy E1.9 configured as part of a subtractive decode port. Thus, if an incoming frame has a destination address that is not recognized by the expander E1, the frame is routed out through E1.9. Similarly, expander E3 is a conventional edge expander with its phy E2.7 configured as a subtractive decode port, and phy E3.1, E3.2, and E3.3 attached to respective mass storage devices (disks 31, 32, and 33).

In the first example, assume that PE0 wishes to communicate to disk 12, in accordance with a connection oriented protocol such as SAS. The following sequence of operations may be followed to establish the connection:

1. PE0 will request a connection to be established with Disk 12 by sending out an OAF (Open Address Frame) frame with Source SAS address=SAS APE0 or APE02, depending on which PE fanout port it elects to use; and the destination SAS address=SAS A12 (the selected target).
1b. When E0 received the OAF frame, the frame is forwarded through the phy E0.1 if the source address is SAS APE01, and the path is locked. On the other hand, if the source address is SAS APE02, the frame is instead forwarded through phy E0.2, and that path is locked.
2. When expander E1 receives the OAF frame and examines the destination SAS address and discovers that device with SAS address SAS A12 is attached to its own phy E1.2, then it will forward the OAF frame to phy E1.2 and send it out to Disk 12. Also, it will lock the routing path from phy E1.8 to phy E1.2.
3. When Disk 12 receives the OAF frame, if it is decided to accept the connection request, it will send back an OPEN_ACCEPT primitive to expander E1.
4. Expander E1 will forward the OPEN_ACCEPT back to PE0 or PE1 through phy E1.8 with the locked routing path.
4b. Expander E0 will then forward the OPEN_ACCEPT through E0.8 or E0.9 (depending on which PE had requested the connection).
5. When PE0 or PE1 has received the OPEN_ACCEPT primitive, the pathway from PE0 or PE1 to Disk 12 through expander E0 (E0.1/E0.2 and E0.8/E0.9) and expander E1 (E1.8, E1.2) is reserved and locked. Now, PE0 and Disk 12 can send payload data information to each other.

Note that the special expander E0 may need to arbitrate if both PE ports 8 and 9 request the same phy.

As another example, consider that PE0 wishes to communicate to Disk 33. The sequence of operations for establishing that connection may be as follows:

1. PE0 will request a connection to be established with Disk 33 by sending out an OAF (Open Address Frame) frame with source SAS address=SAS APE0 and destination SAS address=SAS A33.
1b. Expander E0 forwards the OAF fame, from its port 8 to any one of E0.1, E0.2, and E0.3. This decision may be made based on a previously filled routing table. The path is locked from E0.8 to the selected phy.
2. When expander E1 receives the OAF frame and examine the destination SAS address and discovers that device with SAS address SAS A33 is not attached to any E1 phys, then it will forward the OAF frame to its subtractive decode port E1.9 and let someone else solve the problem, but E1 will lock the path from E1.8 to E1.9.
3. Fanout expander E2 knows all the locations of all devices within the SAS domain. After it has received the OAF frame from its phy E2.1, it examines the destination SAS address of the OAF frame and from its routing table, it knows it can reach the target device from its phy E2.2. Therefore, the fanout expander E2 will forward the OAF frame to phy E2.2 which will then be forwarded to expander E3. The path between E2.1 and E2.2 is also locked.
4. When expander E3 receives the OAF frame and discovers that device with SAS address A33 is attached to its phy E3.3, then it will route the OAF frame to phy E3.3 to be forwarded to Disk 33 and the path from phy E3.3 to the subtractive decode port phy E3.7 is locked because the OAF frame comes from the subtractive decode port phy E3.7.
5. When Disk 33 receives the OAF frame, if it is decided to accept the connection request, it will send back an OPEN_ACCEPT primitive to expander E3 and E3 will forward the OPEN_ACCEPT to the fanout expander E2 though the subtractive decode port.
6. The fanout expander will then forward the OPEN_ACCEPT from E2.2 to E2.1 to expander E1.
7. Expander E1 will then forward the OPEN_ACCEPT received from the subtractive decode port phy E1.9 to phy E1.8 to E0.
7b. Expander E0 uses its routing table to forward the primitive back to E0.8.
8. When PE0 receives the OPEN_ACCEPT primitive, the pathway from PE0 to Disk 33 through expanders E0 (E0.8, E0.1 or E0.2 or E0.3), E1 (E1.8, E1.9), E2 (E2.1, E2.2), and E3 (E3.7, E3.3) is reserved and locked.

Since the external links of the special expander E0 described above behave like those of an end device, instead of an edge expander, the expander E0 may not respond to an incoming Open Address Frame with an Arbitration in Process (AIP) primitive. In other words, during a connection request, the special expander may not provide AIP status. Accordingly, the protocol controller and special expander may need to provide fair access to connection requests, to avoid a connection request timeout from the remote requesting device.

An embodiment of the invention may be a machine readable medium having stored thereon instructions which program a processor to perform some of the operations described above, e.g. configuring the special expander into its special mode of operation. In other embodiments, some of these operations might be performed by specific hardware components that contain hardwired logic. Those operations might alternatively be performed by any combination of programmed computer components and custom hardware components.

A machine-readable medium may include any mechanism for storing or transmitting information in a form readable by a machine (e.g., a computer), not limited to Compact Disc Read-Only Memory (CD-ROMs), Read-Only Memory (ROMs), Random Access Memory (RAM), Erasable Programmable Read-Only Memory (EPROM), and a transmission over the Internet.

Further, a design may go through various stages, from creation to simulation to fabrication. Data representing a design may represent the design in a number of manners.

First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional microelectronic fabrication techniques are used, data representing a hardware model may be the data specifying the presence or absence of various features on different mask layers for masks used to produce the integrated circuit. In any representation of the design, the data may be stored in any form of a machine-readable medium.

The invention is not limited to the specific embodiments described above. For example, the special expander described above may also be part of an edge expander set, as opposed to an embedded expander described in the examples above (that is attached to a protocol controller). In that case, the rules of SAS for implementing an edge expander set may be followed to create a special edge expander set, using special expanders as described above. Accordingly, other embodiments are within the scope of the claims.

What is claimed is:

1. An apparatus comprising:
    an expander to be attached as an intervening device between a communications protocol controller and another attached device, the expander being to misrepresent itself, during an identification process with the another attached device, as being an end device instead of being an edge expander device such that the expander appears to the another attached device to be the end device even though the expander actually is not the end device, the identification process being during a first mode of operation of the expander, the expander also being capable of operating in a second mode of operation that is different from the first mode of operation, the expander being to identify itself and to operate as the edge expander device in the second mode of operation, the expander having fanout ports, the fanout ports being assigned the same SAS port-layer address in the second mode of operation, the same SAS port-layer address to be used to identify the expander when the expander is in the second mode of operation, each fanout port having a phy identifier when the expander is in the second mode of operation that is unique within the expander, each of the fanout ports being assigned a respective unique SAS port-layer address during the first mode of operation, the expander being configured to operate in the first mode during a power-up configuration process by a processor executing boot code from memory, the memory being located on a host bus adapter that also includes the expander and the controller, the processor also being to execute a host operating system.

2. The apparatus of claim 1 wherein the expander has a mode of operation in which it performs subtractive decode routing, and is configurable into another mode of operation in which it presents itself during an identification process with another attached device, as an end device and not an edge expander device.

3. The apparatus of claim 1 wherein the expander has an external port through which it is attached to the controller, and a plurality of further expander ports each of which is to present itself during an identification process as an end device and not an edge expander device.

4. The apparatus of claim 3 further comprising a first edge expander attached to said one of the plurality of further expander ports, and a second edge expander attached to another one of the plurality of further expander ports.

5. The apparatus of claim 4 further comprising a plurality of non-volatile mass storage end devices coupled to a plurality of expander ports of the first edge expander.

6. The apparatus of claim 1 wherein the controller and the expander are integrated within the same integrated circuit package.

7. A storage system comprising:
    a storage controller;
    a special expander to be attached as an intervening device between the controller and another attached device, the expander being to misrepresent itself, during an identification process with the another attached device, as being an end device instead of being an edge expander device such that the expander appears to the another attached device to be the end device even though the expander actually is not the end device, the identification process being during a first mode of operation of the special expander, the special expander also being capable of operating in a second mode of operation that is different from the first mode of operation, the special expander being to identify itself and to operate as the edge expander device in the second mode of operation, the special expander having fanout ports, the fanout ports being assigned the same SAS port-layer address in the second mode of operation, the same SAS port-layer address to be used to identify the special expander when the special expander is in the second mode of operation, each fanout port having a phy identifier when the special expander is in the second mode of operation that is unique within the special expander, each of the fanout ports being assigned a respective unique SAS port-layer address during the first mode of operation, the special expander being configured to operate in the first mode during a power-up configuration process by a processor executing boot code from memory, the memory being located on a host bus adapter that also includes the expander and the controller, the processor also being to execute a host operating system;
    a first expander attached to the special expander;
    a first plurality of nonvolatile mass storage devices attached to the first expander;
    a second expander attached to the special expander;
    a second plurality of nonvolatile mass storage devices attached to the second expander;
    the processor being coupled to the controller; and
    the memory being coupled to the processor and containing instructions that when executed by the processor request an access to mass storage in the system.

8. The system of claim 7 further comprising an integrated circuit package in which the controller and the special expander are integrated.

9. The system of claim 7 wherein the special expander has a mode of operation in which it performs subtractive decode routing, and is configurable into another mode of operation in which it presents itself during an identification process with another attached device, as an end device and not an edge expander device.

10. The system of claim 9 wherein the first and second expanders are edge expander devices.

11. A method, comprising:
    performing an identification process upon first and second expanders,
    wherein the first expander is to be attached as an intervening device between the second expander and another attached device, the first expander being to misrepresent itself, during the identification process with the second expander, as being an end device instead of being an edge expander device such that the first expander appears to the second expander to be the end device even though the first expander actually is not the end device, the identification process being during a first mode of operation of the first expander, the first expander also being capable of operating in a second mode of operation that is different from the first mode of operation, the first expander being to identify itself and to operate as the edge expander device in the second mode of operation, the first expander having fanout ports, the fanout ports being assigned the same SAS port-layer address in the second mode of operation, the same SAS port-layer address to be used to identify the first expander when the first expander is in the second mode of operation, each fanout port having a phy identifier when the first expander is in the second mode of operation that is unique within the special expander, each of the fanout ports being assigned a respective unique SAS port-layer address during the first mode of operation, the first expander being configured to operate in the first mode during a power-up configuration process by a processor executing boot code from memory, the memory being located on a host bus adapter that also includes the first expander and a storage controller, the processor also being to execute a host operating system, and the second expander identifies itself to the first expander as an edge expander device and not an end device.

12. The method of claim 11 further comprising configuring a port of the first expander, to be without subtractive decode routing.

13. The method of claim 12 further comprising performing an identification process upon the first expander and a third expander,
wherein the first expander identifies itself to the third expander as an end device and not an edge expander device, and
the third expander identifies itself to the first expander as an edge expander device and not an end device.

14. The method of claim 13 wherein the first and second expanders are attached by a port layer and a phy layer in the first expander, and the first expander sends an identifier frame to the second expander that includes a port address.

15. The method of claim 13 wherein the first expander sends an identifier frame to the second expander that includes a port address, and another identifier frame to the third expander that includes a different port address.

16. The method of claim 11 further comprising performing an identification process upon the first expander and a third expander,
wherein the first expander identifies itself to the third expander as an end device and not an edge expander device, and
the third expander identifies itself to the first expander as an edge expander device and not an end device.

17. The method of claim 16 wherein the first expander sends an identifier frame to the second expander that includes a port address, and another identifier frame to the third expander that includes a different port address.

18. The method of claim 11 wherein whenever the second expander sends an identifier frame to identify itself, the frame includes the same port address.

19. An article of manufacture comprising:
a machine-readable medium containing instructions that when executed by a computer system configure an expander device to be attached as an intervening device between two other attached devices, the expander device being configured to misrepresent itself, during an identification process with at least one of the attached devices, as being an end device instead of being an edge expander device such that the expander device appears to the at least one of the attached devices to be the end device even though the expander device actually is not the end device, the identification process being during a first mode of operation of the expander device, the expander device also being capable of operating in a second mode of operation that is different from the first mode of operation, the expander device being to identify itself and to operate as the edge expander device in the second mode of operation, the expander device having fanout ports, the fanout ports being assigned the same SAS port-layer address in the second mode of operation, the same SAS port-layer address to be used to identify the expander device when the expander device is in the second mode of operation, each fanout port having a phy identifier when the expander device is in the second mode of operation that is unique within the expander device, each of the fanout ports being assigned a respective unique SAS port-layer address during the first mode of operation, the expander device being configured to operate in the first mode of operation during a power-up configuration process by a processor executing boot code from memory, the memory being located on a host bus adapter that also includes the expander device and the controller, the processor also being to execute a host operating system.

20. The article of manufacture of claim 19 further comprising instructions that, when executed by the computer system, configure a communications protocol controller in the system to accept as valid, that more than one edge expander device can be coupled to the expander device and that the expander device is not a fanout expander.

* * * * *